United States Patent [19]

Jansz

[11] Patent Number: 4,849,189

[45] Date of Patent: Jul. 18, 1989

[54] VANADIUM RECOVERY PROCESS

[75] Inventor: Just J. C. Jansz, Arnhem, Netherlands

[73] Assignee: Shell Internationale Research Maatschappij B.V., Netherlands

[21] Appl. No.: 932,059

[22] Filed: Nov. 18, 1986

[30] Foreign Application Priority Data

Dec. 11, 1985 [GB] United Kingdom ............. 8530496
Mar. 6, 1986 [GB] United Kingdom ............. 8605591

[51] Int. Cl.$^4$ .............................................. C01G 31/00
[52] U.S. Cl. ........................................ 423/64; 423/65; 423/68; 423/592; 502/27; 502/33
[58] Field of Search ................. 423/65, 68, 592, 64; 502/27, 33

[56] References Cited

U.S. PATENT DOCUMENTS

| 4,436,706 | 3/1984 | Nacken et al. | 423/65 |
| 4,443,415 | 4/1984 | Queneau et al. | 423/68 |
| 4,495,157 | 1/1985 | Sebenik et al. | 423/65 |
| 4,539,186 | 9/1985 | Schemei et al. | 423/65 |

FOREIGN PATENT DOCUMENTS 6704017 3/1967 Netherlands.
1167829 10/1969 United Kingdom.
1526927 10/1978 United Kingdom ............. 423/65

OTHER PUBLICATIONS

"Handbuch der Anorganischen Chemie", (Handbook of Inorganic Chemistry), Gmelin, 8 (1968), Vanadium A2, pp. 554–555.
Fundementals of Chemistry 4th Ed., by Brescia et al., Academic Press, N.Y., 1980, pp. 82–83.

Primary Examiner—Patrick P. Garvin
Assistant Examiner—Page C. Harvey
Attorney, Agent, or Firm—Jones, Tullar & Cooper

[57] ABSTRACT

A process for the preparation of pentavalent vanadium compounds from acid extracts obtained by regenerating spent catalysts which contain vanadium, this process comprising the successive steps of (1) oxidizing extracts containing tri- and tetravalent vanadium with an oxygen-containing gas at a pH of at least 0.7 to 1.4 $p_o$ and at most 2.3–1.4 $p_o$ to form a solution of tetravalent vanadium compounds, and (2) continuing the oxidation at a pH lying in the range of from 3.2–1.4 $p_o$ to 2.3–1.4 $p_o$ to form concentrates of pentavalent vanadium having a partial oxygen pressure, 0.05 MPa.

4 Claims, No Drawings

VANADIUM RECOVERY PROCESS

The invention relates to a process for the preparation of pentavalent vanadium compounds by treating acid extracts of vanadium-containing catalysts.

In catalytic hydrocarbon conversion processes such as catalytic cracking, hydrocracking, hydrosulphurization and other hydrogenation processes, the activity of the catalyst gradually diminishes if the crude or residual oil feedstocks contain vanadium. Vanadium then acts as poison and is gradually taken up in the catalyst. In order to prevent this poisoning of the catalyst it is suggested to carry out a separate hydrodemetallization treatment, preceding the desired hydrocarbon conversion process, in order to remove vanadium from the crude or residual oil feedstock. An example of such a treatment is known from the U.K. Pat. No. 1,526,927. This prior publication is also concerned with a method for regenerating the demetalization catalyst, which comprises extracting the catalyst with a mineral acid, such as sulphuric acid. It is indicated in this reference that vanadium may be recovered in a conventional manner from the acid extract so produced but no detailed recovery recipe has been disclosed. Extraction with mineral acid may of course also be applied for regenerating vanadium-loaded catalysts obtained during hydrocracking, catalytic cracking, hydrosulphurization and other hydrogenation processes.

In the acid extracts the vanadium is partly present in the tetravalent oxidation state and it would be attractive to recover the vanadium in the form of solid pentavalent vanadium compounds. For this purpose efficient separation of the solids from the liquid phase is of course an important condition. The oxidation from tetravalent to pentavalent vanadium may be carried out by oxidation with an oxygen-containing gas at a pH above 8, since the oxidation then proceeds rapidly (see "Handbuch der anorganischen Chemie", Handbook of Inorganic Chemistry Gmelin, 8 (1968), Vanadium A2, P. 555). One then obtains a solution of pentavalent vanadium in a good yield, however it is difficult if not impossible to precipitate solid pentavalent vanadium compounds from this solution in a form which is readily filterable.

If the oxidation is carried out at a pH in the mildly acid region (of Netherlands patent application No. 6.704.017, page 5, first paragraph, published Sept. 18, 1968, for example at a pH of approx. 3, the filterability of the solid vanadium compounds during further processing is better, while the oxidation velocity is still sufficiently attractive.

However, since a strong acid is used for the extraction of the spent catalysts, the extracts usually have a pH below 1. The essential increasing of the pH to a value of approx. 3 is unfortunately accompanied by the formation of a solid but non-filterable side-product, which remains unchanged during the subsequent oxidation. A closer examination of the formation of this precipitate has shown that it is mainly caused by the co-presence of trivalent vanadium in the acid extracts.

The problem associated with the presence of trivalent vanadium in the acid extracts may be remedied by the method, disclosed in U.S. Pat. No. 4,436,706, in which method extracts containing trivalent and tetravalent vanadium are oxidized at a pH between 0.5 and 2.6 with an oxygen-containing gas to form concentrates of tetravalent vanadium, after which the extracts are oxidized at a pH between 2.6 and 4.0 with an oxygen-containing gas to form concentrates of pentavalent vanadium. The resultant two-stage oxidation process yields either directly solid pentavalent vanadium compounds having good filterability or solutions of pentavalent vanadium compounds from which readily filterable solid pentavalent compounds can be subsequently precipitated.

From all working examples in U.S. Pat. No. 4,436,706 the highest filtration rate, when determined employing commercial, standard filtration equipment e.g. a vacuum rotary drum filter, is in the order of 200 to 300 $kg.m^{-2}.h^{-1}$, determined at 3 mm filter cake thickness and a pressure differential of 0.07 MPa. This analysis method is used throughout in this specification for denoting filtration rate.

From further research it was found that the relevant prior art method leaves room for further improvement. The present invention therefore seeks to conceive such an improvement.

The Applicants have found that there is a correlation between the pH and the partial oxygen pressure, at which the first and the second processing steps are carried out. This correlation to a large extent defines an area in which the recovery method yields optimal results in terms of filtration rate of the envisaged solid, pentavalent vanadium compounds. In addition it was found that the method of this invention also yields higher vanadium recovery rates, which rate represents the sum of the vanadium oxidation rate and vanadium filtration rate.

The process of the present invention relates to a two-step oxidation method for the preparation of pentavalent vanadium compounds from acid extracts, which have been obtained by regenerating spent catalysts, the oxidation method comprising the successive steps of (1) oxidizing extracts containing tri- and tetravalent vanadium with an oxygen-containing gas at a pH of at least $0.7-1.4\ p_o$ and at most $2.3-1.4\ p_o$ to form a solution of tetravalent vanadium compounds and (2) continuing the oxidation at a pH lying in the range of from $3.2-1.4\ p_o$ to $2.3-1.4\ p_o$ to form concentrates of pentavalent vanadium, in which $p_o$ stands for the partial oxygen pressure, in $MP_o$.

During the oxidation in the first step the pH is most preferably kept constant by the addition of a basic material, for example NaOH or $NH_4OH$. The temperature is preferably between 15° and 70° C. The reaction time is usually less than 2 hours and preferably less than 30 minutes. The reaction is preferably carried out in the presence of cupric-ions which are added to the reaction mixture as cupric salts.

The oxidation is carried out with an oxygen-containing gas, preferably air or oxygen.

After the first oxidation step, the pH is increased by the addition of a base, for example NaOH or $H_4OH$. The second oxidation step to convert tetravalent into pentavalent vanadium is subsequently carried out with the aid of an oxygen-containing gas, for example air or oxygen, preferably at a constant pH. Oxygen is preferred. The oxygen may be used in excess and non-converted oxygen may be recycled via a pump system. The reaction time is mostly less than 4 hours, the temperature is preferably from 70° to 110° C.

Both the first and the second oxidation step are preferably effected at partial oxygen pressures of from 0.05 to 1.0 MPa, most preferred are partial oxygen pressures of from 0.07 to 0.5 MPa.

Optimum filtration rates will be obtained when at least the second and optionally also the first oxidation step are effected in the copresence of ferric compounds in an amount corresponding with a molar ratio of vanadium:iron of from 200:1 to 1:1, most preferably from 50:1 to 3:1. When the acid extracts, that are employed as starting materials in the process of this invention do not contain these amounts of ferric compounds, the latter may be incorporated into the acid extracts, either as such or in the form of their precursors being ferrous compounds. During the oxidation of vanadium to higher valencies, oxidation of di- to trivalent iron will occur and this will ensure the appropriate copresence of ferric compounds in the liquid system to be reprocessed in accordance with the method of this invention.

When carrying out the first oxidation step the conversion of trivalent to tetravalent vanadium should be as complete as possible; this does not, however, apply to the conversion of tetravalent to pentavalent vanadium in the second oxidation step. It has been found that the degree of conversion and the reaction temperature in the second oxidation step are important parameters for the ultimate production of solid vanadium compounds having the desired case of filtration.

When a relatively high temperature, e.g. 70° to 110° C., is used in the second oxidation step, a solid is directly precipitated during the oxidation, the ratio between tetravalent and pentavalent vanadium in the solid then being between 0.10:1 and 0.30:1. This solid is found to have a very good filterability and this embodiment of the process according to the invention is therefore most preferred. The precipitate approximately has the composition of corvusite ($V_2O_{4.6}V_2O_5 \cdot nH_2O$). Subsequent to filtration the remaining liquid is found to contain only very little vanadium. However, it is also possible to obtain a similar material like substance by carrying out the second oxidation step at a lower temperature, provided that the oxidation is continued for such a period of time that the ratio between tetravalent and pentavalent vandium is within the limits discussed. In that case the oxidation results in a clear solution from which a corvusite-like substance is subsequently precipitated by merely raising the temperature to values in excess of 75° C.

Another preferred embodiment is based on a more complete conversion in the second oxidation step. To this end a degree of conversion into pentavalent vanadium of at least 85%, preferably at least 95%, is provided for at an oxidation temperature of 35° to 70° C. A clear solution of substantially pentavalent vanadium then results. By the addition of a strong acid, such as sulphuric acid, a solid is precipitated from the solution which solid may best be described as "red cake". This precipitation proceeds at elevated temperature, preferably at a temperature above 90° C.

It has been found that the solid vanadium concentrates obtained by the method of this invention can be recovered from the aqueous phase in conventional filtration equipment. Both a high settling rate at an attractively high filtration rate are obtained, thus leading to an economic recovery method for valuable vanadium products that can be sold in the market.

The invention is illustrated in greater detail in the working examples described hereinafter.

EXAMPLE 1

Two solutions A and B were prepared, solution A was identical to the solution disclosed in U.S. Pat. No. 4,436,706 and denoted as "vanadium concentrate" in Example 1 thereof.

Solution B was prepared by dissolving various metal compounds in water. The specifications of solutions A and B are listed in Table I.

TABLE I

|  | A | B |
| --- | --- | --- |
| V (III) g/l | 6.6 | 10.8 |
| V (IV) g/l | 9.8 | 18.1 |
| Ni g/l | 2.0 | 6.0 |
| Fe g/l | 1.24 | 0.0 |
| Ca g/l | 0.12 | 0.14 |
| SO$_4$ g/l | 73.0 | 114 |
| Ph | 0.85 | 0.35 |

Run a was carried out for purpose of comparison, runs b and c are examples in accordance with this invention.

Run a:

Example 1 of U.S. Pat. No. 4,436,706 was repeated under identical conditions, these include partial oxygen pressures during the first and second oxidation step of 0.02 MPa and 0.03 MPa, respectively the oxidizing gas being air in the first and oxygen in the second step. The temperatures in the first, and the second step, were 20° C. and 85° C. respectively. Run time was 4 hours. The filtration rate in this run was 250 kg.m$^{-2}$.h$^{-1}$. This corresponds with a liquids filtration rate of 160 l.m$^{-2}$.h$^{-1}$ as indicated in Example 1 of U.S. Pat. No. 4,436,706. However, as it is the solids filtration rate and not the liquids filtration rate, that governs the economics of the present vanadium recovery method, the solid pentavalent vanadium compounds representing the product of interest, it is the former rate only that will be referred to in all further test runs.

Run b:

Ferric sulphate was added to solution B in order to adjust its trivalent iron concentration to 1.0 g.l$^{-1}$, the pH was adjusted to 2.0 by addition of sodium hydroxide. The first stage oxidation was carried out in the manner indicated in run a, above. Then, the pH of the solution was raised to 2.3 by further addition of sodium hydroxide and the temperature was increased to 95° C. The second stage oxidation was effected at a partial oxygen pressure of 0.32 MPa. By gradual addition of sodium hydroxide the pH was kept constant at 2.3 during the total run-time of 3 hours.

The conversion into solid pentavalent vanadium compounds was 97%, the filtration rate was 750 kg.m$^{-2}$.h$^{-1}$.

Run c:

Rub b was repeated under the same conditions except the pH now being adjusted to 2.7, the partial oxygen pressure was 0.12 MPa. This time the filtration rate was 660 kg.m$^{-2}$.h$^{-1}$. Vanadium recovery was 99%.

EXAMPLE 2

For additional comparison runs d and e were carried out at low pH conditions, run f at high pH condition and in run g the influence of the iron concentration was demonstrated by leaving the ferric concentration in solution b unchanged.

Run d:

In the second oxidation step the pH was adjusted to 2.3, the partial oxygen pressure was 0.12 MPa, otherwise run b was closely followed employing solution B as starting material for the first oxidation step after adjusting the ferric concentration to 1.0 g.l$^{-1}$. Filtration rate: 300 kg.m$^{-2}$.h$^{-1}$. Vanadium recovery: 80%.

Run e:

In the second oxidation step the pH was adjusted to 2.0, the partial pressure was 0.32 MPa, otherwise run b was closely followed employing solution B as starting material for the first oxidation step after adjusting the ferric concentration to 1.0 g.l$^{-1}$. Filtration rate: 280 kg.m$^{-2}$.h$^{-1}$. Vanadium recovery: 84%.

Run f:

In the second oxidation step the pH was adjusted to 3.0, the partial oxygen pressure was 0.32 MPa, otherwise rub b was closely followed employing solution B as starting material in the first oxidation step after adjusting the ferric concentration to 1.0 g.l$^{-1}$. Filtration rate: 225 kg.m$^{-2}$.h$^{-1}$. Vanadium recovery: 75%.

Run g:

Solution B was employed as starting material in the first oxidation step leaving the total iron concentration unchanged. This step was carried cut as disclosed for run b.

In the second oxidation step, the pH was 2.7 and the partial oxygen pressure was 0.12 MPa. Filtration rate: 20 kg.m$^{-2}$.h$^{-1}$.

I claim:

1. A process for the preparation of pentavalent vanadium compounds from acid extracts obtained by regenerating spent catalysts which contain vanadium, comprising the steps of:

oxidizing extracts containing tri- and tetravalent vanadium with an oxygen-containing gas a pH of at least 0.7–1.4 $P_o$ and at most 2.3–1.4 $P_o$ to form a solution of tetravalent vanadium compounds; and continuing the oxidation at a pH lying in the range of from 3.2–1.4 $P_o$ to 2.3–1.4 $P_o$, wherein the partial oxygen pressure is at least 0.05 MPa, and in the copresence of ferric compounds in an amount corresponding with an anionic ratio of vanadium.

2. The process as claimed in claim 1, wherein the partial oxygen pressure is form 0.07 to 0.5 MPa.

3. The process as claimed in claim 1, wherein the temperature during the first oxidation step is from 15° to 70° C.

4. The process as claimed in claim 1, wherein the temperature during the continued oxidation step is from 70° to 110° C.

* * * * *